March 26, 1968  H. G. OSWIN  3,375,140
FUEL CELL WITH HYDROGEN PURIFICATION MEANS
AND PROCESS OF USING SAME
Filed Sept. 8, 1964
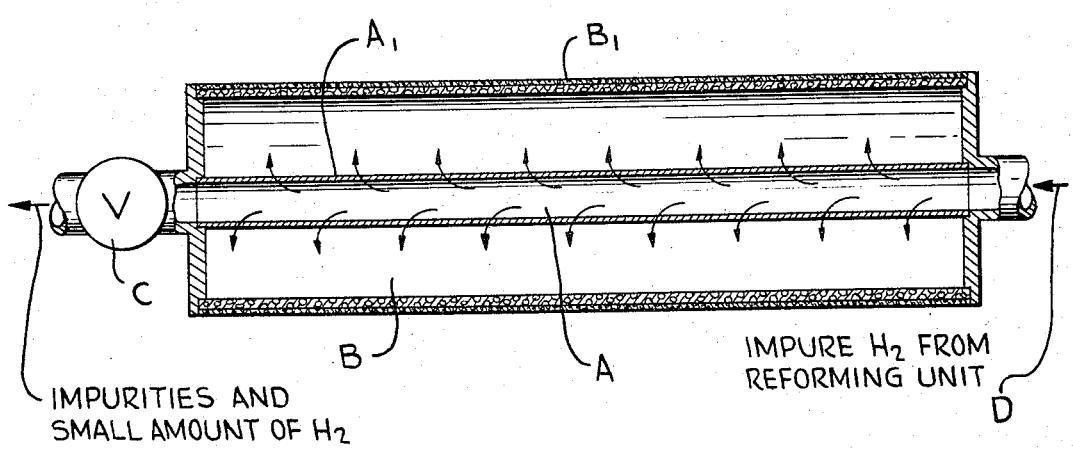
INVENTOR,
HARRY G. OSWIN
BY Watson, Cole, Grindle & Watson
ATTORNEYS United States Patent Office 3,375,140
Patented Mar. 26, 1968

3,375,140
FUEL CELL WITH HYDROGEN PURIFICATION MEANS AND PROCESS OF USING SAME
Harry G. Oswin, Chauncey, N.Y., assignor to Leesona Corporation, Warwick, R.I., a corporation of Massachusetts
Continuation-in-part of application Ser. No. 51,678, Aug. 24, 1960. This application Sept. 8, 1964, Ser. No. 394,829
4 Claims. (Cl. 136—86)

This application is a continuation-in-part of my co-pending application Ser. No. 51,678, now Patent No. 3,148,089, filed Aug. 24, 1960.

This invention relates to improved fuel cell systems for the direct production of electrical current from a fuel and oxidant. More particularly, the invention relates to an in situ process of producing and/or purifying hydrogen fuel within a fuel cell.

The term fuel cell, as used in the present specification, designates an electrochemical cell capable of generating electrical energy directly from the electrochemical combustion of a fuel and oxidant. Basically, such cells comprise a housing, two electrodes, and an electrolyte between said electrodes which functions as an ion-transfer medium. Conventional fuel cells consume a fuel such as hydrogen or a hydrocarbon at the fuel electrode. Electrons are separated from the fuel species and are transferred via an external circuit to the oxidizing electrode for utilization. It is essential that the electrolyte employed prevent the molecular forms of the fuel and oxidant from mixing and transferring their electrons directly.

In the prior art, most fuel cells comprise electrodes consisting of porous structures in which a three-phase interface of solid, gas, and electrolyte is maintained by a suitable combination of pore size of the electrode, pressure differential of reactant, and surface tension of electrolyte. However, such structures have numerous disadvantages. For example, it is substantially impossible to maintain completely uniform pore size in the electrodes resulting in an electrode which operates with the smaller pores flooded with electrolyte due to capillary action or with gas bubbling through the larger pores unconsumed. To a large extent, the aforesaid problem was overcome by the use of a bi-porous electrode wherein the larger pores front the reactant gas and the smaller pores are in contact with the electrolyte. The reaction interface occurs substantially at the bi-porous wall.

Bi-porous electrodes, however, are not completely satisfactory where an impure fuel is employed. For example, when impure hydrogen is fed to a bi-porous anode, the hydrogen is consumed quite rapidly, initially, but in time the impurities in the fuel collect in the electrode blocking the pores, eliminating their utilization in the electrochemical reaction. Moreover, the impurities in time contaminate the electrodes rendering the electrochemical reaction less efficient.

Accordingly, it is an object of the present invention to provide a fuel cell comprising a porous electrode unit which is not deactivated when operated on impure fuels.

It is another object of the invention to provide an in situ process of purifying hydrogen within a fuel cell.

It is another object of the invention to provide an in situ process of producing and purifying hydrogen within a fuel cell.

These and other objects of the invention will be apparent from the following detailed description with particular emphasis being directed to the preferred embodiment.

The objects of the present invention are accomplished by designing a fuel cell comprising a porous anode in combination with a non-porous hydrogen diffusion palladium or palladium-silver alloy membrane. More specifically, the non-porous membrane is positioned within the fuel cell between the fuel gas supply and the porous electrode. In this manner, impure hydrogen obtained by cracking or reforming a hydrocarbon is passed in contact with the membrane, under pressure, permitting the passage of pure hydrogen into the porous anode. The impurities are vented by suitable means.

The reforming or cracking process can be accomplished within the fuel cell, preferably closely adjacent the non-porous membrane, or the cracking can be performed in an ancillary unit. In the former case, a suitable reform or cracking catalyst is placed immediately adjacent the non-porous membrane. A hydrogen producing fuel such as methanol, ethanol, or carbon monoxide is fed to the site of the cracking catalyst where the fuel undergoes a reform and/or shift reaction producing hydrogen gas and by-product. The hydrogen is extracted from the reaction site by permeation of the non-porous hydrogen diffusion membrane. In this manner, the equilibrium of the refrom and/or shift reaction is unbalanced, favoring the formation of more hydrogen. In the latter case, the impure hydrogen from an ancillary reforming unit is passed into the fuel cell, preferably at an elevated temperature, for example the working temperature of the reform unit. The hydrogen is extracted from the impure fuel flow by permeation of the non-porous membrane into the vicinity of the porous anode.

Turning now to the drawing which illustrates one embodiment of the invention, the flow of impure gas coming from an external reforming or cracking unit is circulated to feeding means D and then into chamber A in contact with a non-porous hydrogen permeable membrane $A_1$ diffusing the purified hydrogen into chamber B. Chamber B is adjacent to fuel electrode $B_1$ of the fuel cell system. The impurities plus a small amount of hydrogen are controlled by an exit valve or pressure release valve C so that the exhaust gases contain very little, if any, hydrogen. The impurities may be recovered or disposed of as waste. The lead tubes to and from the fuel cell chamber are of any suitable conduit material.

In the cell described, it is necessary that the pressure of the hydrogen in chamber B be maintained at less than the hydrogen pressure in chamber A in order to obtain a continuous diffusion of hydrogen from chamber A into chamber B for feeding to the anode. Preferably, the reforming and diffusion unit is operated at a relatively high pressure, i.e., in the neighborhood of 200 to 500 p.s.i., with the hydrogen gas adjacent the anode being maintained at a somewhat lower pressure.

The diffusion tubes can be constructed from pure palladium or palladium-silver alloys. Palladium-silver alloys containing from about 5 to 40 percent by weight of silver are operable with an alloy composed of about 25 percent silver and 75 percent palladium being preferred because of the alloys outstanding diffusion characteristics. The thickness of the non-porous membranes depends to a large extent upon the pressure differential to be applied across the membrane and upon the rapidity of the diffusion desired. Diffusion of hydrogen gas through the membrane is directly proportional to the pressure differential across the membrane and inversely proportional to the membrane thickness. The minimum thickness is immaterial as long as the membrane is completely non-porous and is structurally able to withstand the necessary pressure of the cell. The preferred range of thickness is from about 0.5 to 30 mils, with the essential requirement being that the membranes are completely free of holes in order that impurities will not be passed into the anode fuel compartment.

The catalyst which is to be employed in the reforming or cracking process can be any of the commonly employed catalysts. In instances where the catalyst is to be maintained in intimate contact with, or adjacent to the nonporous hydrogen diffusion membrane, low temperature catalysts should be selected in order that the operating temperature of the fuel cell need not be excessive. Depending upon the hydrogen generating fuel employed and the operating temperature of the fuel cell, one particular catalyst may be more advantageous than another. In general, however, elemental materials, their oxides and mixtures thereof, are operable. Mixtures of zinc, copper, and chromium with minor traces of iron are highly effective. If the catalyst is to be maintained in intimate contact with the membrane, it can be employed as a powder or applied to the non-porous membrane as a relatively thin coating. A powdered catalyst can be maintained in intimate contact with the non-porous membrane in the dry state employing a suitable support grid or screen, or the catalyst can be made up into a paste-like mixture and applied as such to the membrane. Although the thickness of the catalytic layer is not critical, normally the layer will be from about 2 to 100 mils thick when maintained adjacent to or in contact with a membrane having a thickness of from about 0.5 to 10 mils. As is apparent, the thinner the layer, the more efficient will be the hydrogen extraction and transference of heat.

The porous anodes which are to be used with the non-porous hydrogen diffusion membrane are the homoporous and bi-porous structures generally employed in the art. Thus, bi-porous structures such as nickel electrodes are suitable. Other porous anodes include carbon substrate electrodes activated with a catalytic material. The selection of the anode as well as the cathode of the fuel cell is within the ability of one skilled in the art and will depend upon materials available and the temperature at which the cell is operated.

The present cell can be operated with a variety of electrolytes including acid and alkaline electrolytes such as sulfuric acid, phosphoric acid, potassium hydroxide, sodium hydroxide, etc. Since the anode of the cell is only fed with pure hydrogen, there is no problem of impure gases passing into the electrolyte unconsumed and thereby detrimentally effecting the electrolyte.

Having described the invention in general terms, the following example is set forth to more particularly illustrate the invention. However, the invention is not to be construed to be limiting by the example, since other embodiments can be conveniently devised without departing from the scope of the invention.

*Example*

A fuel cell is constructed in a suitable housing employing a metallic silver oxide coated carbon plate as the oxidizing electrode and an anode unit comprising a tubular-shaped carbon body containing a Raney nickel catalyst in combination with a non-porous, 75 percent palladium, 25 percent silver alloy tubular membrane as illustrated in the drawing. The cell uses a 28 percent aqueous potassium hydroxide electrolyte and is maintained in combination with an external hydrogen reforming unit. The reforming unit, for flowing gaseous materials into chamber A as shown in the drawing, is operated at a pressure of 200 p.s.i.g. The pressure in compartment B is maintained at approximately 45 p.s.i.g. The cell, when operated at a temperature of 250° C., will sustain a current density of 1,000 amps./ft.$^2$.

It is claimed:

1. A fuel cell for the generation of electrical energy directly from a fuel and oxidant comprising an electrolyte, at least one oxidizing electrode, at least one fuel electrode, said electrodes being in contact with said electrolyte, means for providing fuel to said fuel electrode and means for providing oxidant to said oxidizing electrode, said fuel electrode comprising a porous body in combination with a non-porous hydrogen diffusion membrane, said porous body and said non-porous hydrogen diffusion membrane being spaced apart to form a chamber therebetween and said non-porous hydrogen diffusion membrane being adjacent said means for providing fuel to said electrode, said means for providing fuel being so constructed and arranged that the fuel initially contacts the diffusion membrane when entering the electrode such that only hydrogen diffuses therethrough to the porous body.

2. In a fuel cell a hydrogen diffusion electrode structure in combination with a hydrogen reforming unit, said electrode structure being composed of internal and external tubes, the internal tube carrying hydrogen and gaseous impurities under pressure from said reforming unit and diffusing hydrogen into the external tube, said external tube in combination with the internal tube forming a fuel gas compartment and being the fuel electrode of the fuel cell, the pressure of the gas between the internal and external tubes being maintained at a lower pressure than in the internal tube, said internal tube being a non-porous membrane selected from the group consisting of palladium and palladium-silver alloys containing from 5 to 40 percent by weight silver and said external tube being a porous body.

3. The electrode structure of claim 2 wherein the internal tube is composed of a palladium-silver alloy.

4. The in situ process of supplying a fuel gas to a hydrogen diffusion fuel cell comprising reforming hydrocarbons into gaseous components, flowing said gaseous components through a non-porous hydrogen diffusion tube under pressure whereby the hydrogen gas diffuses through said tube into a porous tube, said porous tube in combination with said non-porous tube forming the fuel gas compartment, and said porous tube being the fuel electrode, the pressure of the gas between said porous tube and non-porous tube being maintained at a lower pressure than in the non-porous tube, said non-porous tube being a member of the group consisting of palladium and palladium-silver alloys containing from 5 to 40 percent by weight silver.

References Cited

UNITED STATES PATENTS

| | | | |
|---|---|---|---|
| 2,384,463 | 9/1945 | Gunn et al. | 136—86 |
| 3,092,517 | 6/1963 | Oswin | 136—86 |
| 3,148,089 | 9/1964 | Oswin | 136—86 |

ALLLEN B. CURTIS, *Primary Examiner.*

WINSTON A. DOUGLAS, *Examiner.*

H. FEELEY, *Assistant Examiner.*